United States Patent Office 3,325,467
Patented June 13, 1967

3,325,467
TRISAZO DYESTUFFS AND THEIR METHOD OF PREPARATION
Marcel Jirou, Sotteville-les-Rouen, and Vasili Urne, Rouen, France, assignors to Etablissements Kuhlmann, Paris, France
No Drawing. Filed Nov. 18, 1963, Ser. No. 324,235
Claims priority, application France, Dec. 4, 1959, 812,101
6 Claims. (Cl. 260—145)

The present invention concerns trisazo dyestuffs and method for their preparation and this application is a continuation-in-part of our application Ser. No. 73,205, filed Dec. 2, 1960, and now abandoned.

It particularly relates to trisazo dyestuffs of the general formula:

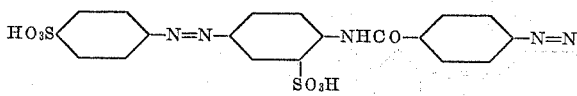 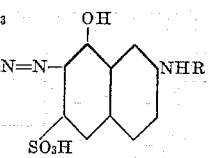

in which R represents a member selected from the group consisting of the phenyl, methoxyphenyl, ethoxyphenyl, 4-carboxyphenyl, sulphophenyl, and 3-sulphonamidophenyl radicals, as well as their copper derivatives.

These dyestuffs may be prepared by diazotizing the aminoazo compound of the formula:

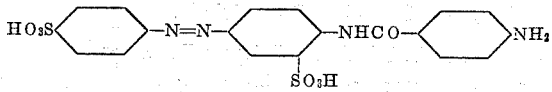

and coupling the diazo derivative thus obtained with the ω-methylsulphonic derivative of ortho-anisidine in a neutral medium. The removal of the ω-methyl-sulphonic group in the diazo dyestuff so obtained is effected in the hot by the action of a dilute aqueous solution of β-naphthalene-sulphonic acid.

To re-diazotize the amino-disazo compound

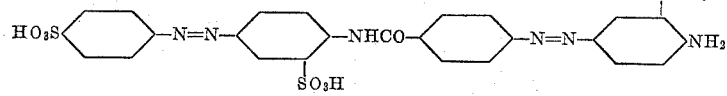

the following procedure may be used: the compound is dissolved as its alkali metal salt, excess sodium nitrite is added to the solution obtained, and it is then made acid to Congo red at 40–45° C. by means of β-naphthalene-sulphonic acid.

The final coupling with the N-substituted derivative of 2-amino-8-naphthol-6-sulphonic acid is advantageously effected in the presence of sodium bicarbonate and pyridine.

In order to convert it into a copper derivative, the trisazo dyestuff obtained is heated with an ammoniacal solution of a divalent copper salt, which leads to the dealkylation of the methoxy group in the ortho position to the azo linkage and to the fixation of the metal through the hydroxyl groups in the ortho,ortho'-position to the same linkage. If the metallization agent is present in excess, the dyestuff fixes more copper than is required by the stoichiometric proportion. Copper derivatives are thus obtained which contain one or more atoms of metal to one molecule of dyestuff.

The copper derivatives prepared according to the invention are particularly suitable for dyeing vegetable fibers. The dyeings obtained are distinguished by their good general fastness.

The invention will be more clearly understood by reference to the following examples, in which the parts indicated are parts by weight, and which are purely illustrative.

Example 1

47.5 parts of 4″-amino-4′-benzoylamino-azobenzene-4,3′-disulphonic acid are dissolved in 300 parts of water by means of dilute caustic soda; after the addition of 7 parts of sodium nitrite, this solution is introduced into a mixture of ice and hydrochloric acid. The mineral acidity of the suspension obtained is neutralized and a solution of ortho-anisidine-ω-methyl-sodium sulphonate corresponding to 12.4 parts of base is added. The pH of the mixture is then taken to 6.0 by addition of a solution of sodium carbonate. The following day the solution of the dyestuff is introduced into a mixture of 800 parts of water at 100° C., 55 parts of commercial β-naphthalene-sulphonic acid and 80 parts of common salt.

After agitating for two hours at 100° C., the elimination of the ω-methylsulphonic group is complete. The dyestuff is filtered and redissolved in 1600 parts of water at 50° C. with the help of caustic soda.

8.5 parts of sodium nitrite in a dilute solution are added to the solution obtained and then 48 parts of commercial β-naphthalene-sulphonic acid in an aqueous solution are slowly added at 45° C. so that the mixture becomes strongly acid to Congo red. After agitating for some hours at 40–45° C., during which a strong excess of nitrous acid is maintained by the simultaneous addition of sodium nitrite, the diazotization is complete. The diazo compound is separated by filtration. It is coupled with 31.5 parts of 2-phenylamino-8-naphthol-6-sulphonic acid in the presence of sodium bicarbonate and pyridine. The trisazo dyestuff is isolated and suitably purified.

The metallization is effected in the following way: the dyestuff paste is dissolved in 2,400 parts of hot water to which 10 parts of sodium bicarbonate have been added. A solution of cupric sulphate composed of 25 parts of copper sulphate, 150 parts of water and 56.5 parts of 20% by volume ammonia, is slowly added at 80° C. The mixture is then heated for 20 hours at 95° C. with agitation. The dyestuff is separated by salting out. It contains one atom of copper per molecule and dyes vegetable fibers a soft grey shade.

If at the end of the metallization a further equivalent of ammoniacal copper sulphate is added to the reaction mixture, a dyestuff is obtained which has analogous tinctorial properties, but which contains two atoms of metal to one molecule of dyestuff.

Example 2

On replacing the 31.5 parts of 2-phenylamino-8-naphthol-6-sulphonic acid in the preceding example by 35.9 parts of 4′-carboxy-2-phenylamino-8-naphthol-6-sulphonic acid, a trisazo dyestuff is obtained of which the cupric derivatives containing one or two atoms of metal dye vegetable fibers a grey shade which is distinctly more greenish than that of Example 1.

Example 3

On replacing the final coupling compound used in Example 1 by 3'-sulphamido-2-phenylamino-8-naphthol-6-sulphonic acid, a trisazo dyestuff is obtained whose copper derivatives dye vegetable fibers a greenish grey shade.

Example 4

On replacing the final coupling component in Example 1 by 3' - sulpho-2-phenylamino-8-naphthol-6-sulphonic acid a trisazo dyestuff is obtained the copper derivative of which dyes vegetable fibers a neutral grey.

Example 5

On replacing the 31.5 parts of 2-phenyl-amino-8-naphthol-6-sulphonic acid in Example 1 by 34.5 parts of 4' - methoxy - 2-phenylamino-8-naphthol-6-sulphonic acid a trisazo dyestuff is obtained the copper derivative of which dyes vegetable fibers a grey shade which is more reddish than that of Example 1.

We claim:
1. Trisazo dyestuffs of the following formula:

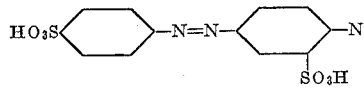
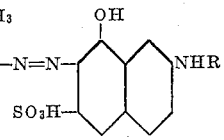

in which R represents a member selected from the group consisting of the phenyl, methoxyphenyl, ethoxyphenyl, 4 - carboxyphenyl, sulphophenyl, and 3-sulphonamidophenyl radicals or the copper derivatives thereof containing from one to two atoms of copper per molecule of dyestuff.

2. Trisazo dyestuff as claimed in claim 1 in which R represents the 4-carboxy phenyl radical.

3. Copper derivatives of the trisazo dyestuff claimed in claim 2 containing from one to two atoms of copper per molecule of dyestuff.

4. Trisazo dyestuff as claimed in claim 1 in which R represents the 3-sulphonamidophenyl radical.

5. Copper derivatives of the trisazo dyestuff claimed in claim 4 containing from one to two atoms of copper per molecule of dyestuff.

6. A process for the preparation of the azo dyestuffs defined in claim 1 which comprises reacting the diazo derivative of the dyestuff of the formula:

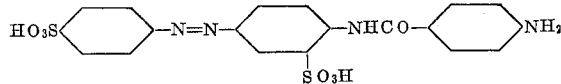

with the ω-methylsulphonic derivative of orthoanisidine, eliminating the ω-methylsulphonic group in the disazo dyestuff formed by means of a hot aqueous solution of β-naphthalene-sulphonic acid, diazotizing the aminodiazo dyestuff and coupling the diazo-disazo compound with 2-amino-8-naphthol-6-sulphonic acid substituted on the amino group by the radical R as defined in claim 1.

References Cited

UNITED STATES PATENTS
2,746,953  5/1956  Dickey et al. _____ 260—158

FOREIGN PATENTS
738,309  10/1955  Great Britain.

CHARLES B. PARKER, *Primary Examiner.*

FLOYD D. HIGEL, *Assistant Examiner.*